Oct. 16, 1951 — R. W. GOOCH — 2,571,128
CURRENT FEED AND HOLDER FOR POSITIVE CARBON
OF MOTION PICTURE PROJECTOR LAMPS
Filed Jan. 31, 1950 — 2 Sheets-Sheet 1
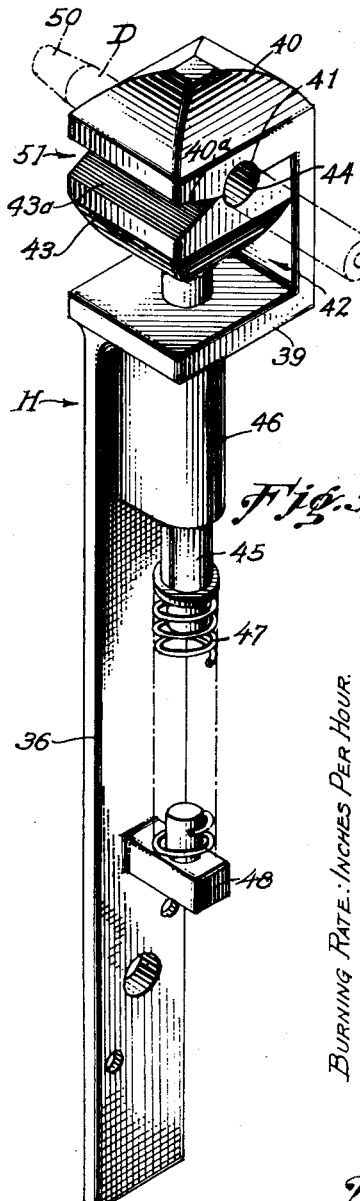
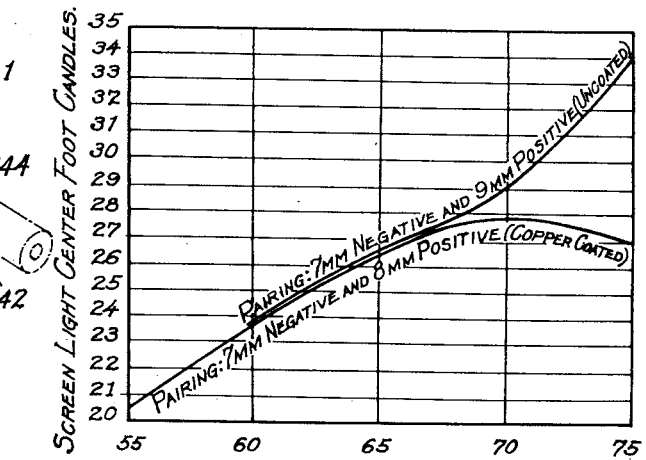
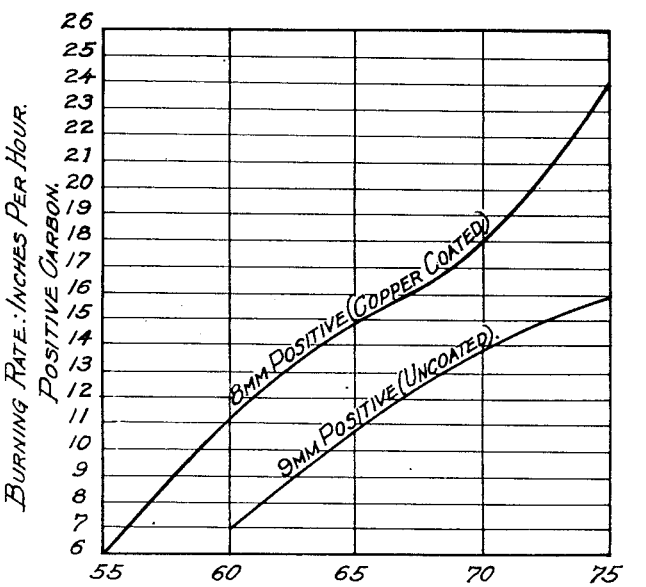
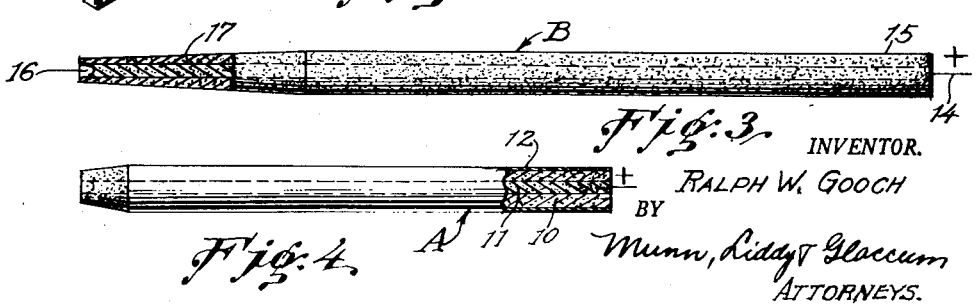
INVENTOR.
RALPH W. GOOCH
BY
Munn, Liddy & Glaccum
ATTORNEYS.

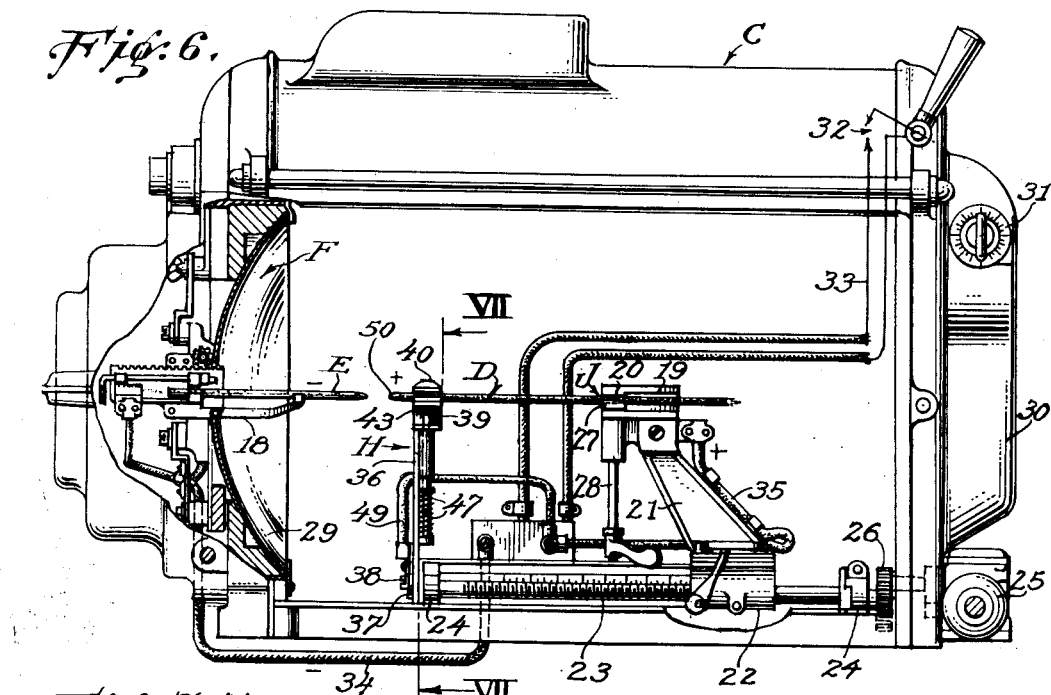
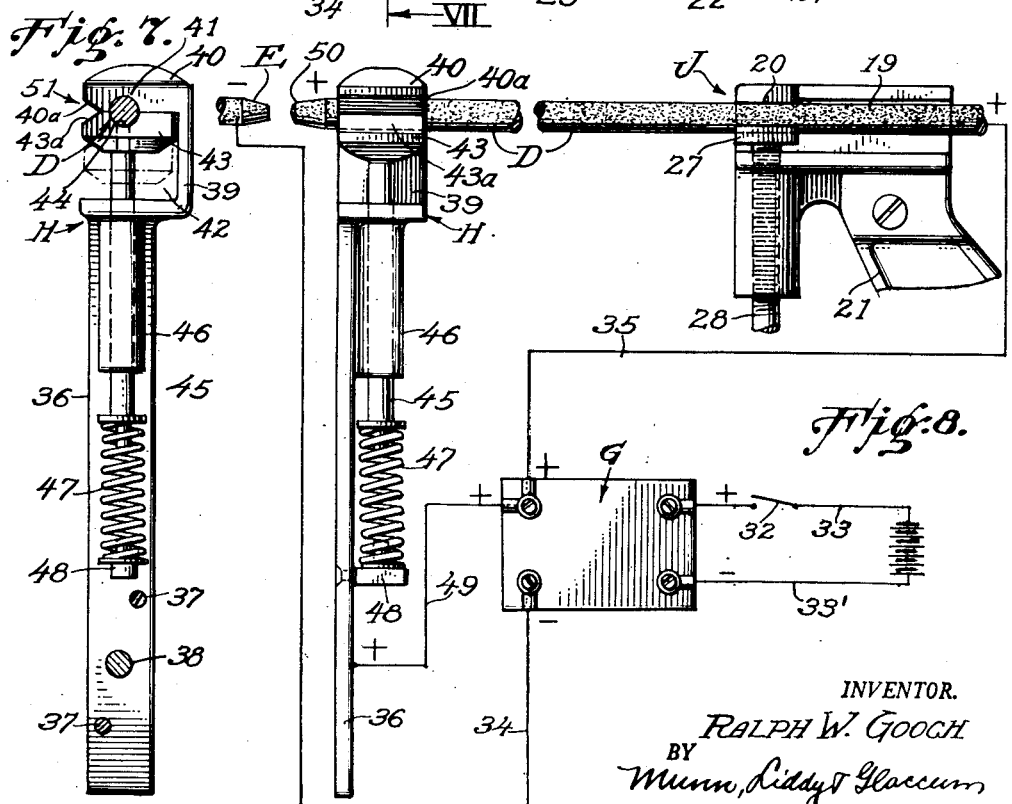

Patented Oct. 16, 1951

2,571,128

UNITED STATES PATENT OFFICE 2,571,128

CURRENT FEED AND HOLDER FOR POSITIVE CARBON OF MOTION-PICTURE PROJECTOR LAMPS

Ralph W. Gooch, Mill Valley, Calif.

Application January 31, 1950, Serial No. 141,534

6 Claims. (Cl. 313—238)

The present invention relates to improvements in a current feed and holder for positive carbon of motion picture projector lamp. It consists of the combinations, constructions, and arrangement of parts, as hereinafter described and claimed.

An object of my invention is to provide a current feed for the positive carbon of a motion picture projector lamp that will preclude "pencilling back" of the carbon, while permitting an uncoated carbon to be employed.

Another object of the invention resides in the provision of an improved holder, which will allow the positive carbon to be inserted or withdrawn with facility and ease. The holder will retain the positive carbon in proper relation with respect to the negative carbon, and still permit proper advancement of the positive carbon during the burning of the two carbons.

A still further object is to provide a carbon holder having a pair of coacting jaws embracing the positive carbon near its crated end. A portion of the current is delivered to these jaws to prevent "pencilling" of the uncoated carbon, while the remaining part of the positive current is delivered to the usual carbon-advancing jaws near the outer end of the carbon.

The foregoing objects are accomplished without requiring forced air or water-cooled jaws as heretofore employed.

Other objects and advantages will appear as the specification continues. The novel features of the invention will be set forth in the claims hereunto appended.

Drawings

For a better understanding of my invention, reference should be had to the accompanying drawings, forming part of this application, in which:

Figure 1 is a graph chart showing carbon pairings that will give an equal light output at equal currents, even if one carbon is of larger diameter;

Figure 2 is another graph chart illustrating the burn-away rate for a given current on pairing of carbons;

Figure 3 is an elevational view of a positive carbon, partly in section, disclosing "pencilling back" of this carbon;

Figure 4 is an elevational view, partly in section, illustrating a copper-coated positive carbon;

Figure 5 is an isometric view of my improved carbon holder;

Figure 6 is a side elevation of a motion picture projector lamp, disclosing my carbon holder installed therein, the door of the lamp being removed, and parts being shown in section;

Figure 7 is a transverse sectional view taken along the line VII—VII of Figure 6, illustrating the carbon holder; and Figure 8 is an enlarged fragmentary view of part of the mechanism for advancing the positive carbon, and further showing my improved holder and electric circuit for the positive and negative carbons.

While I have shown only the preferred form of my invention, it should be understood that various changes, or modifications, may be made within the scope of the annexed claims without departing from the spirit thereof.

Detailed description

There are in general use in the motion picture theatres today two types of projection lamps. These lamps use carbon electrodes to form a carbon arc from which the light is used to project the picture. These carbon electrodes are special type called "Suprex."

These "Suprex" carbons have characteristics which cause them to give a light that is termed high intensity (a light source of a continuous spectrum) at relatively low current values. "Suprex" carbons are in general use in three different sizes and recommended for use in three different current ranges. The 6 mm. negative and 7 mm. positive current range is 40 to 50 amperes; the 7 mm. negative and 8 mm. positive current range is 60 to 70 amperes; and the 8 mm. negative and 9 mm. positive current range is 75 to 85 amperes.

The major portion of the theatres use the 6 mm.–7 mm. and 7mm.–8 mm. pairing, since the light output from these two pairings fall within the range required by the average size theatre. However excellent the light output and operation from the use of these carbons and lamps designed for their use might be, as is to be expected, much room for improvement remains both with respect to light output and operation of the projector lamps.

The "Suprex" arc is very critical with respect to voltage and current conditions at the arc; that is, very slight changes in voltage and current conditions at the arc cause large and annoying changes from normal light output. Also, these "Suprex" arcs have a tendency to fall out of high intensity when the voltage and current conditions deviate from normal. The effect on screen light when high intensity is lost is to cause the light to lose its continuous spectrum characteristics; the volume of light decreases far below normal and the color will be blue, or in some special cases brown. The effect of this color change from the normal white, of course, is detrimental to good picture values.

Another defect in these "Suprex" arc lights is "creeping" due to displacement of the arc from the optical center or plane of the elliptical mirror used to collect the light from the arc and concentrate it at the aperture of the projector. There are two factors here which make it necessary to maintain the arc within close limits with respect to its position in relation to the mirror. One factor is characteristic of the "Suprex" arc; the other is certain optical characteristics of the elliptical mirror.

In the "Suprex" arc, the plane from which the light is to be collected that has the most continuous spectrum (white light) is very narrow and lies at right angles and even with the crater on the positive carbon. In the elliptical mirror used in these arc lamps the mirror is of a large diameter and a short focal length and are worked at a relatively high F value, approximately F 2.3. This means that the depth of focus of this optical system will be very shallow. To sum up these two effects means that any displacement from the ideal position will seriously affect the color and intensity of the light on the screen.

Since all of these defects cannot be completely eliminated from this type of carbon arc some method is necessary to hold them within reasonable limits. This can be stated in one word "regulation." When the statement is made that good regulation is obtained, it is used as a relative term. It refers to the amount of control which has been effected over the above-mentioned defects, or any defects which are present in the "Suprex" arc.

In the past, the only method of effecting this desired regulation has been to use a high burn-away rate of the carbon electrodes. The following extract is quoted from The National Carbon Company handbook, entitled "National Projector Carbons," fourth edition (1949), page 60: "For most efficient operation, all carbon arc trims should be operated at or near the maximum recommended current. Here and there is found a projectionist who uses a trim of larger diameter than indicated in order to save trimming or cut carbon cost. By so doing, he sacrifices quantity, quality and steadiness of light."

This, of course, says in effect that to realize good regulation a high burn-away rate of the carbons should be used. When examining graph charts (see Figures 1 and 2 of accompanying drawings), which show the burn-away rate and light output from any given pairing of carbons against current, it will be seen that the burn-away rate will increase much more rapidly for a given current than does the light output.

If this line of investigation is followed further, it will be found that there are carbon pairings available which will give an equal light output at equal currents, even if one carbon is of larger diameter. This can be seen in the graph presented in Figure 1 where one pairing is 7 mm. negative and 8 mm. positive, and the other pairing is 7 mm. negative and 9 mm. positive. Also, it can be seen from Figure 1 that at 70 amperes, which is the maximum current rating for the 7 mm. and 8 mm. pairing, that the light output is greater with the 7 mm. and 9 mm. pairing. If the graph chart shown in Figure 2 is examined, which is plotted to show the burn-away rate for a given current on these two pairings, it will be seen that the burn-away rate is less by an important percentage for the 7 mm. and 9 mm. pairing than for the 7 mm. and 8 mm. pairing.

It can be seen that if some method is available by which good regulation can be obtained without the necessity of using a high burn-away rate of the carbon electrodes, important savings can be made in the operating expense of the theatre. Such a method of achieving this good regulation is available in my copending application on "Automatic Arc Lighting Apparatus and the Like," Serial No. 782,123, filed in the United States Patent Office on November 25, 1947, and maturing into Patent No. 2,488,861, on November 22, 1949.

Since better regulation can be obtained electronically than by using the high burn-away rate, it is obvious that the electrode pairing can be used at and below the minimum current rating and screen light—which is the end result—will not suffer. In fact, in most instances, it will be improved due to this improved regulation.

Other controls have been designed in the past but none, so far as is known, will give sufficient regulation to make this system of reduced carbon consumption practical, with the exception of the above-mentioned control. Also, any attempts to improve the regulation by increasing the sensitivity and closeness of control over the voltage and current conditions at the arc have given negative results. The reason for this negative response is that there are inherent defects in this type of arc and the electrodes over which this type of a control has no effect.

Carbon electrodes for producing a carbon arc are manufactured in a multitude of types and sizes. In Figure 4 I show a positive carbon A, including a carbon electrode 10 having a core 11 extending axially therethrough. This electrode is coated substantially the full length thereof with copper 12. The purpose of this copper coating is to enable small diameter carbon electrodes to carry the full load of current over their full length without undue heating thereof.

Referring to Figure 3, I have disclosed a positive carbon B, which is not provided with a copper coating. In this view, a positive wire 14 leading from a source of current, has been shown as being connected to the outer end portion 15 of the carbon B. In this case, the resistance in the electrode will cause the carbon to heat, causing an effect known as "spindling" or "pencilling back" from the crater end 16. The "pencilling back" area is indicated at 17. This "pencilling back" will cause the carbon to lose diameter rapidly until the current at the arc (crater end 16) drops to a value which will no longer sustain an arc.

As illustrated in Figure 6, I have shown a well-known motion picture projector lamp having a housing C. In this lamp, the positive and negative carbon electrodes D and E, respectively, are in alignment with one another. The positive electrode is not coated with copper, thus making its cost relatively smaller than the cost of copper-coated electrodes. The negative carbon E is disposed in a holder 18, with means provided for adjusting it both horizontally and vertically so that a symmetrical crater can be formed.

The positive carbon D has its outer end portion 19 inserted sidewise into a slot 20 formed in a carbon-gripping clamp J mounted on the usual carbon-advancing bracket 21. The latter is anchored to an internally-threaded sleeve 22 that encircles and engages with a threaded drive shaft 23. This shaft is journalled in a sub-base assembly 24, and is rotated by a motor 25 connected thereto by gearing 26. The bracket 21 has a shoe 27, which may be raised or lowered relative to the carbon D by a threaded rod 28. When the shoe 27 is raised, the carbon D will be clamped in the slot 20.

It is quite obvious from this construction that rotation of the drive shaft 23 in one direction will operate to advance the positive carbon D toward the negative carbon E, while a reverse rotation of the drive shaft 23 will retract the positive carbon from the negative carbon. The mirror of the lamp is designated at F. It will be noted that this mirror surrounds the negative carbon E, and has its concave reflecting surface 29 directed toward the apertured end 30 of the projector lamp.

The speed of the motor 25 is regulated by a rheostat control 31. A switch 32 is provided in a current feed line 33 leading to a junction box G. The latter has a negative conductor 34 connected thereto, which leads to the negative carbon E. A positive conductor 35 leads from the junction box to the outer end portion 19 of the positive carbon D. The negative conductor 33' leads from the box back to the source of current.

The parts of the motion picture projector lamp and the electrical circuits thus far described are conventional, and are well-known in the art.

In Figures 5 to 8, inclusive, my holder for the positive carbon D is indicated generally at H. It includes a bracket 36, which is secured to the sub-base assembly 24 by dowel pins 37 and a stud 38. This bracket has a squared C-shaped head 39 fashioned at its upper end (see Figures 5 and 7). The head defines a fixed jaw 40 having a semi-circular groove 41 designed to fit over the top of the positive carbon D.

Within the recess 42 of the head 39, I mount a movable jaw 43. The latter is fashioned with a semi-circular groove 44 shaped to fit against the underneath surface of the carbon D. The jaw 43 is fixed to the top of a plunger 45, and the latter is guided in a bearing 46 cast on the bracket 36. A compression spring 47 is interposed between the lower end of the plunger 45 and an arm 48 fixed to and projecting from the bracket 36.

In order to facilitate insertion of the positive carbon D between the jaws 40 and 43, the latter are provided with bevelled edges 40a and 43a, respectively, which are directed toward grooves 41 and 44, respectively. It should be noted that the slot 20 in the carbon-gripping clamp J is axially aligned with the carbon-receiving aperture provided in the holder H by the grooves 41 and 44. Thus the operator can push the positive carbon D edgewise into the clamp slot 20 and the aperture of the holder defined by the grooves 41 and 44, all in one operation.

By applying pressure, and at the same time rotating the positive carbon D slightly, this carbon is inserted easily between the jaws 40 and 43. This can be accomplished without the necessity of touching the jaws with the hands, or using a tool to open them. The jaws will be hot when a new trim is inserted. Any attempt to insert the trim or carbon between the jaws from the end of the latter brings up the danger of coming in contact with other parts of the lamp that will be hot enough to cause serious burns. Therefore, the side threading or inserting feature is two-fold in purpose: first, the matter of ease and convenience of trimming; and, secondly, the safety measure.

The junction box G has a positive conductor 49 connected to the bracket 36 of the holder H so as to deliver part of the current to the crater end 50 of the positive carbon D. As previously stated, part of the current is delivered by the positive conductor 35 to the outer end portion 19 of the positive carbon.

The holder H, in conjunction with the advancing carbon D as it is burned away, makes the electrical contact to this carbon near the arc. This holder maintains the positive carbon in the proper relation with respect to the optical train, and even will prevent a crooked carbon from climbing out of alignment with the negative carbon E. In the ordinary projector lamp, without my holder H, such a crooked carbon will climb out of place to such an extent that it is no longer possible to maintain a symmetrical crater, and a poor screen light will result.

Also, the lamp to which I refer has no provision for using uncoated carbons, such as a 9 mm. x 20 inch high intensity carbon suggested in Figure 3. Since it has been shown that these large diameter carbons can be used to good advantage, a system for using them in these lamps is in order. Secondly, since it is intended to convert the present lamps to use these carbons, a system which is practical and reasonable in price should be used.

In the present holder H, the side trimming feature is new and useful, since it is only necessary to place the carbon D in the V-shaped notch 51 defined by the bevelled edges 40a—43a of the jaws; and then apply pressure, while rotating the carbon slightly, to insert the carbon. Once the carbon D is disposed between the jaws in the grooves 41—44 thereof, the movable jaw 43 will be moved upwardly by the spring 47. This spring gives an equal pressure over the full surface of the lower jaw, which is in contact with the carbon D. This gives good electrical contact to the positive carbon and allows it to be fed through the jaws without undue pressure on the carbon. The bracket 21 and shoe 27 define the carbon-gripping clamp J.

It is not intended that the jaws 40—43 should carry the full load of the arc current, but only that portion which is necessary to prevent "pencilling" of the uncoated carbon D. This portion is equal to the voltage drop across the carbon between the present carbon-gripping clamp J and the new holder H to be used. In an arc drawing 60 amperes, with a distance of 10 inches between the clamp J and the holder H, this load is about 5 amperes, or 7% of the total current load.

Since the current load is small on the jaws 40—43, no undue difficulty will be encountered with respect to pitting, or overheating due to heavy current loads. At the same time, the effect on the arc and carbon will be the same as if the full current load were applied to the jaws 40—43.

In the past, and for use in arc lamps designed for the 9 mm. uncoated high intensity carbon, jaws have been designed and used. However, these jaws always have carried the full current load; and, as a consequence, were expensive and troublesome. In later years, jaws have been in use of this general type; and in order to overcome the difficulties encountered with the old type jaws, these jaws have been cooled by either a draft of air from a fan or blower, or by circulating water through a jacket surrounding the jaw.

Although air-cooled or water-cooled jaws partially solve the problems of the previously non-cooled jaws, there was always present the danger of failure of the fan or circulation of water due to drop in water pressure. Moreover, if either fails, these jaws will not operate for a sufficient length of time to permit continuous operation. In the case of water-cooled jaws, loss of water pressure during operation for a short while and then return of the water pressure would cause the jaw to explode. This has been known to happen.

The above-mentioned air or water-cooled jaws have been designed primarily for use in projection lamps somewhat different than the high intensity lamps on which my holder H is intended to be used. These lamps employing air or water-cooled jaws are generally termed "high-low reflector lamp," in which an elliptical mirror is used and the negative carbon is positioned below the positive carbon and on an angle of approximately 60°. In such lamps, the positive carbon is rotated in order that a symmetrical crater can be formed. Then, a mechanism is necessary to rotate the positive carbon and this presumably brings up problems in design which makes it undesirable to divide the current load as is intended with my holder H.

As an example of the utility of my holder in conjunction with electronic arc control, this equipment was installed in a theatre. The 7 mm. coated negative and 9 mm. x 20 inch uncoated trim was used in place of the 7 mm. and 8 mm. coated trim. The light on the screen was 15 foot candles at the center and 8 foot candles at the side—a side to-to-center distribution of 53.3%. Since the screen had an area of 23.5 feet x 17 feet, the total screen lumens was 23.5 x 17 x 15 x 53.3% = 3194.

After the conversion, the light on the screen was 15 foot candles at the center and 10 foot candles at the side—a center-to-side distribution of 66.6%. The total screen lumens was 23.5 x 17 x 15 x 66.6% = 3991. This gave an increase of 797 lumens, and at the same time the cost of the positive carbons was reduced by 36.79%. This reduction in carbon cost is not possible where the copper-coated carbons are used.

I claim:

1. In combination: a carbon-advancing bracket of a motion picture projector lamp; a carbon-gripping clamp mounted on the bracket having a sidewise-opening slot to receive a rear section of a positive carbon; a holder having a pair of coacting jaws positioned to embrace a forward section of the carbon adjacent to the crater end of the carbon; the jaws having carbon-receiving grooves axially aligned with the slot in the clamp; and a positive current feed for the carbon having one leg leading to the clamp and the other leg leading to the holder.

2. In combination: a carbon-advancing bracket of a motion picture projector lamp; a carbon-gripping clamp mounted on the bracket having a sidewise-opening slot to receive a rear section of a positive carbon; and a holder having a pair of coacting jaws positioned to embrace a forward section of the carbon adjacent to the crater end of the carbon; the jaws having carbon-receiving grooves axially aligned with the slot in the clamp; the jaws having bevelled edges defining a V-shaped notch converging toward the grooves in the jaws; the V-shaped notch facing in the same direction as the sidewise opening slot in the clamp; whereby a carbon can be connected to the bracket and holder by inserting it laterally between the jaws and into the slot while holding the carbon parallel to the axis of the slot and grooves.

3. In combination: a carbon-gripping clamp positioned to embrace a rear section of a positive carbon of a motion picture projector lamp; a stationary holder having coacting jaws disposed to slidably embrace a forward section of the carbon adjacent to the crater end of the carbon; means for advancing the clamp to project the carbon through the holder; a conductor leading from a positive source of direct current to the clamp for carrying the current to the rear section of the carbon; and a second conductor extending from the source of direct current to the jaws of the holder to deliver a portion of the current to the forward section of the carbon.

4. In a holder for a positive carbon of a motion picture projector lamp: a bracket having a fixed jaw thereon provided with a carbon-receiving groove; a movable jaw supported for movement toward and away from the fixed jaw; the movable jaw having a carbon-receiving groove complementary to the groove in the fixed jaw; and yielding means urging the movable jaw toward the fixed jaw to embrace a carbon interposed therebetween in the grooves.

5. In a holder for a positive carbon of a motion picture projector lamp: a bracket having a fixed jaw thereon provided with a carbon-receiving groove; a movable jaw supported for movement toward and away from the fixed jaw; the movable jaw having a carbon-receiving groove complementary to the groove in the fixed jaw; and yielding means urging the movable jaw toward the fixed jaw to embrace a carbon interposed therebetween in the grooves; the fixed jaw being disposed over the top of the carbon and the movable jaw being placed underneath the carbon.

6. In a holder for positive carbon of a motion picture projector lamp: a bracket having a fixed jaw thereon provided with a carbon-receiving groove; a movable jaw supported for movement toward and away from the fixed jaw; the movable jaw having a carbon-receiving groove complementary to the groove in the fixed jaw; and yielding means urging the movable jaw toward the fixed jaw to embrace a carbon interposed therebetween in the grooves; the jaws having bevelled edges defining a V-shaped notch converging toward the grooves in the jaws.

RALPH W. GOOCH.

REFERENCES CITED

The following references are of record in the file of this patent:

UNITED STATES PATENTS

| Number | Name | Date |
|---|---|---|
| 2,065,891 | Hall | Dec. 29, 1936 |
| 2,237,223 | Hall | Apr. 1, 1941 |
| 2,385,440 | Hakki | Sept. 25, 1945 |

FOREIGN PATENTS

| Number | Country | Date |
|---|---|---|
| 710,501 | Germany | Sept. 15, 1941 |